United States Patent
Gehlsen (10) Patent No.: US 9,259,792 B2
(45) Date of Patent: Feb. 16, 2016

(54) 5-AXIS HOLE TRANSFER SYSTEM AND METHOD

(71) Applicant: The Boeing Company, Seal Beach, CA (US)

(72) Inventor: Paul R Gehlsen, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 233 days.

(21) Appl. No.: 14/010,363

(22) Filed: Aug. 26, 2013

(65) Prior Publication Data

US 2015/0056031 A1   Feb. 26, 2015

(51) Int. Cl.
| | |
|---|---|
| *B23B 35/00* | (2006.01) |
| *B23B 39/26* | (2006.01) |
| *B23B 39/14* | (2006.01) |
| *B23Q 1/54* | (2006.01) |
| *B23Q 1/62* | (2006.01) |

(Continued)

(52) U.S. Cl.
CPC ............... *B23B 39/26* (2013.01); *B23B 39/14* (2013.01); *B23Q 1/5462* (2013.01); *B23Q 1/621* (2013.01); *B23Q 35/02* (2013.01); *F16M 11/14* (2013.01); *B23B 35/00* (2013.01); *B23B 2215/04* (2013.01); *B23B 2247/04* (2013.01); *B23B 2270/34* (2013.01); *F16C 11/0614* (2013.01); *F16C 11/106* (2013.01); *F16C 2322/39* (2013.01); *Y10T 408/03* (2015.01); *Y10T 408/08* (2015.01); *Y10T 408/553* (2015.01); *Y10T 408/567* (2015.01); *Y10T 408/5612* (2015.01); *Y10T 408/6764* (2015.01); *Y10T 408/888* (2015.01); *Y10T 408/93* (2015.01)

(58) Field of Classification Search
CPC ................. Y10T 408/553; Y10T 408/5612; Y10T 408/567; Y10T 408/93; Y10T 408/935; Y10T 408/03; Y10T 408/08; B23B 35/00; B23B 39/04; B23B 39/06; B23B 39/14; B23B 39/26; B23B 47/28; B23B 2215/04; B23B 2247/04
USPC ............... 408/1 R, 3, 75, 88, 115 R, 236, 237
See application file for complete search history.

(56) References Cited

U.S. PATENT DOCUMENTS

| | | | | |
|---|---|---|---|---|
| 2,732,734 | A | * | 1/1956 | Polliard ............................ 408/3 |
| 2,816,465 | A | * | 12/1957 | Honnef ............................ 408/3 |

(Continued)

FOREIGN PATENT DOCUMENTS

| | | |
|---|---|---|
| DE | 102010029288 | 12/2011 |
| EP | 0399924 | 11/1990 |

OTHER PUBLICATIONS

European Patent Office; Extended European Search Report; for EP Application No. 14180363.5 dated Jan. 27, 2015.

*Primary Examiner* — Daniel Howell
*Assistant Examiner* — Yasir Diab
(74) *Attorney, Agent, or Firm* — Parsons Behle & Latimer (57) ABSTRACT

A system is disclosed that accepts portable power feed drilling equipment and enables the mechanical determination of an existing hole vector and duplication of the hole on the same vector in a new production part. The system allows for extremely accurate match drilling of parts with multiple, variable hole vectors. In addition, the system is adjustable in the Z-axis, which allows infinite and precise drill tip positioning prior to drilling to increase accuracy and manage chip exit. Interchangeable drill adaptors internal to the quill sleeve allow for a wide size range of drills to be used.

18 Claims, 8 Drawing Sheets

(51) Int. Cl.
  *B23Q 35/02* (2006.01)
  *F16M 11/14* (2006.01)
  *F16C 11/06* (2006.01)
  *F16C 11/10* (2006.01)

(56) References Cited

U.S. PATENT DOCUMENTS

| | | | |
|---|---|---|---|
| 3,487,731 A * | 1/1970 | Coon | 408/79 |
| 3,518,918 A | 7/1970 | Keown | |
| 4,332,066 A * | 6/1982 | Hailey et al. | 29/26 R |
| 4,613,262 A * | 9/1986 | Woods | 409/211 |
| 5,000,416 A | 3/1991 | Fantasia | |
| 5,017,062 A * | 5/1991 | Leroux et al. | 409/179 |
| 5,163,791 A * | 11/1992 | Norton | 408/79 |
| 5,239,160 A | 8/1993 | Sakura et al. | |
| 5,769,576 A * | 6/1998 | Gerard | B23C 3/055 408/236 |
| 6,059,703 A * | 5/2000 | Heisel et al. | 483/31 |
| 6,301,525 B1 | 10/2001 | Neumann | |
| 6,719,506 B2 | 4/2004 | Chang et al. | |
| 6,808,344 B2 | 10/2004 | Chen | |
| 6,839,607 B2 | 1/2005 | Wooten | |
| 8,362,392 B2 | 1/2013 | Elfizy | |

\* cited by examiner

5-AXIS HOLE TRANSFER SYSTEM AND METHOD

FIELD OF THE DISCLOSURE

The present application relates generally to systems for transferring hole patterns from a first component to a second component.

BACKGROUND

When repairing an aircraft, machine, or other assembly of parts, a part may be removed and replaced with a new part. If the part to be replaced includes a drilled hole pattern, it is typically desirable to replicate the hole pattern as closely as possible on the new part in order for the new part to fit with existing parts. During duplication of the hole pattern, the vector (i.e., orientation) of each hole should be reproduced precisely, even variation from hole to hole. In addition, the size, relative position, and orientation relative to the part surface(s) of each hole should be duplicated in the new part, if possible.

Various known methods exist for performing hole pattern duplication. For example, a computer numerical controlled (CNC) machine or a jig bore can be used to transfer a hole pattern from one part to another. However, such machines typically require a reliable power source and a trained operator. Even then, the accuracy of duplication may vary from one operator to another. In certain parts of the world, such as remote locations or locations without a reliable power source (i.e., grid) and/or trained operators, CNC machines and jig bores are not practical to use for repairs.

SUMMARY

The present application discloses a hole transfer system with a gimbal assembly, which mechanically captures a 5-axis hole vector for duplicating the hole precisely and secures a motor and drill at that vector, without requiring the assistance of a computer or other electronics.

In one example, a system is disclosed for transferring one or more holes from a first workpiece to a second workpiece that is a substantial duplicate of the first workpiece. The system comprises a gimbal assembly configured to mechanically determine a first position of a first hole in the first workpiece. The first position comprises a first set of X, Y and Z coordinates relative to a surface of the first workpiece. The gimbal assembly is further configured to mechanically determine a first vector of the first hole within the first workpiece, and to secure a drill at substantially the same vector as the first vector of the first hole while a second hole is drilled at a second position in the second workpiece. The second position relative to the second workpiece is substantially the same as the first position relative to the first workpiece.

The gimbal assembly may further comprise a floating gimbal surrounded by a locking nut that releasably fixes the position of the floating gimbal. The gimbal assembly may also further comprise an alignment component configured to telescope in the Z-axis. The alignment component may comprise a quill sleeve. The alignment component may also be configured to receive and secure a plurality of interchangeable drill adaptors, wherein each drill adaptor corresponds to a different drill.

In another example, a system comprises a gimbal surrounded by a clamp ring and a clamp nut and a quill sleeve housed within the gimbal. The gimbal is configured to rotate freely within the clamp ring when the clamp nut is loose and to remain locked in a substantially fixed position within the clamp ring when the clamp nut is tightened. The quill sleeve is configured to adjust to a desired vertical position relative to the gimbal and is further configured to receive and secure a drill adaptor.

The system may further comprise an adjustment nut and a conical nut coupled to the quill sleeve and configured to adjust the quill sleeve to a desired vertical position relative to the gimbal. The system may further comprise a gantry slidably mounted to an X-Y transfer table and a cross slide assembly slidably mounted to the gantry, wherein the gimbal is housed within a gimbal assembly coupled to the cross slide assembly. The system may further comprise a base module coupled to the X-Y transfer table, wherein the base module is configured to receive and secure a first workpiece at a selected first position in an X-axis, Y-axis, and Z-axis, the first workpiece having a plurality of holes arranged in a first hole pattern. The base module may further be configured to receive and secure a second workpiece substantially identical to the first workpiece in which the first hole pattern is desired to be replicated, the second workpiece being secured at a selected second position such that the second workpiece is substantially parallel to the first workpiece in the Y-axis at a selected offset distance, d, and is substantially aligned with the first workpiece with substantially zero offset in the X-axis and the Z-axis. The system may further comprise a transfer bar slidably mounted to the gantry, wherein the transfer bar includes two or more index bushings separated by a selected offset distance, d, and configured to engage with an index pin coupled to the cross slide assembly.

In another example, a method is disclosed for duplicating a hole from a first workpiece to a second workpiece substantially identical to the first workpiece. The method comprises positioning a gimbal assembly over a first hole at a first location relative to the first workpiece, inserting a step pin into the first hole, and inserting an alignment pin into the gimbal assembly. The method further comprises mechanically aligning the alignment pin with the step pin to determine a first vector of the first hole, securing the gimbal assembly in alignment with the first vector, removing the alignment pin from the gimbal assembly, and removing the step pin from the first hole. The method further comprises moving the gimbal assembly to a second location over the second workpiece, wherein the second location relative to the second workpiece is substantially the same as the first location relative to the first workpiece, and drilling a second hole in the second workpiece at the second location and at a second vector that is substantially the same as the first vector.

Positioning the gimbal assembly over the first hole may comprise sliding a gantry along one or more base rails and sliding a cross slide along one or more gantry rails. Mechanically aligning the gimbal assembly may comprise rotating and tilting a floating gimbal within a clamp ring. Securing the gimbal assembly may comprise tightening a clamp nut. The method may further comprise adjusting an alignment component to a desired vertical position within the gimbal assembly, which may comprise rotating an adjustment nut to a desired vertical position, and then tightening a conical nut until it reaches a bottom surface of a gimbal. The method may further comprise temporarily securing the gimbal assembly over the first hole location after the gimbal assembly is secured in alignment with the first vector, which may comprise engaging a lockdown clamp with a transfer bar slidably mounted to a gantry in which the gimbal assembly is housed. Moving the gimbal assembly to the second location over the second workpiece may comprise disengaging an index pin from a first index bushing, moving the cross slide by a selected offset distance, d, and engaging the index pin with a second index bushing. The first hole may be duplicated in the second workpiece with a variation of no more than about 1/1000 inch from the location and vector of the first hole in the first workpiece.

BRIEF DESCRIPTION OF THE DRAWINGS

Like reference numbers and designations in the various drawings indicate like elements.

DETAILED DESCRIPTION

Figure 1A:
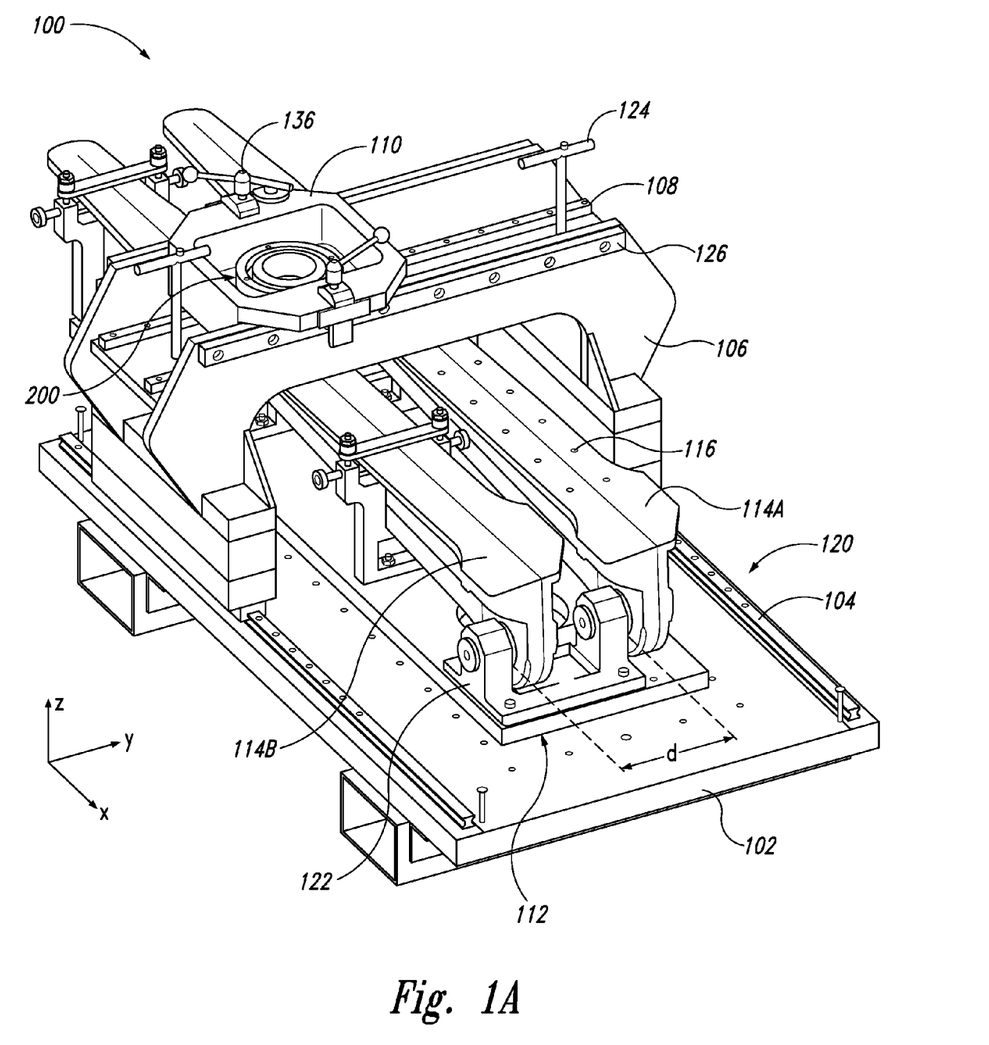
FIG. 1A illustrates a front perspective view of one example of a hole transfer system having a gimbal assembly.
Figure 1B:
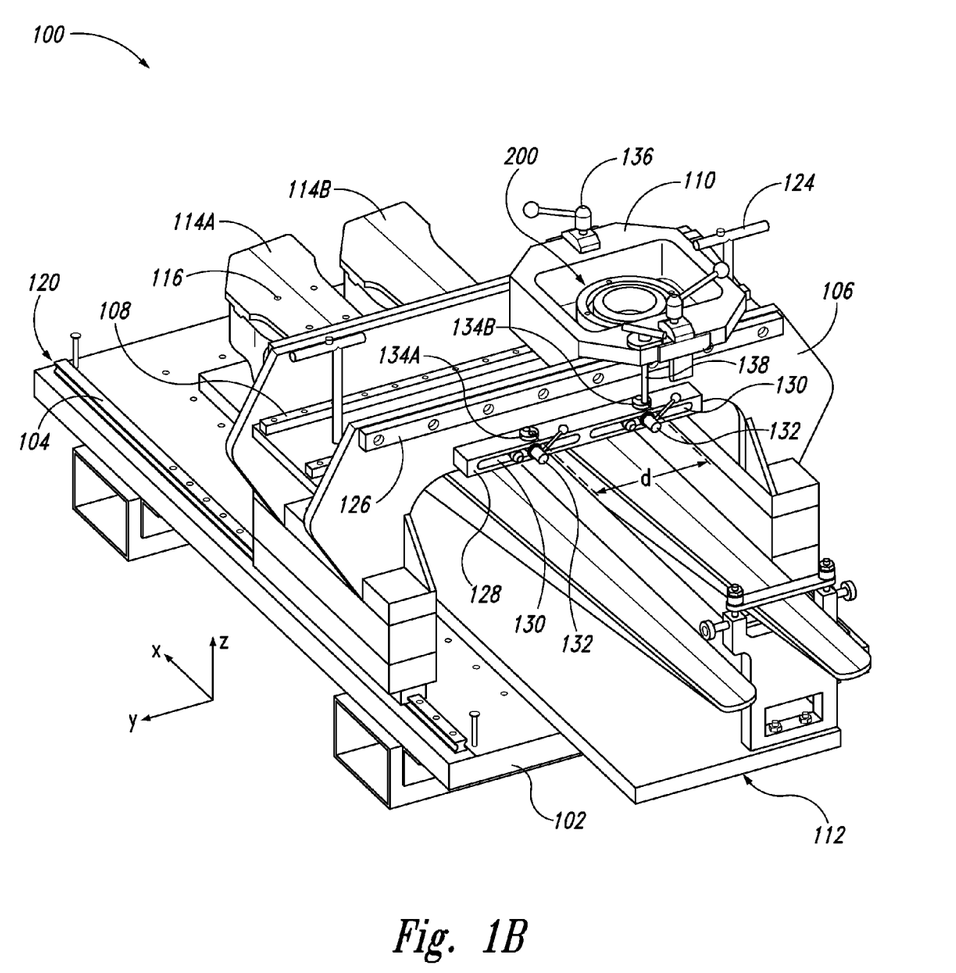
FIG. 1B illustrates a rear perspective view of the hole transfer system shown in FIG. 1A.

FIGS. 1A and 1B illustrate one example of a hole transfer system 100 in accordance with the present application. In the illustrated example, the system 100 comprises an X-Y transfer table 120 with a base plate 102 having a base module 112 mounted thereon. The base module 112 comprises one or more mounts 122 configured to secure two or more workpieces 114 in a selected alignment relative to one another. For example, in the case illustrated in FIGS. 1A and 1B, the workpieces 114 are aligned with substantially zero offset in the X-axis and with a fixed, known offset distance, d, in the Y-axis. The workpieces 114 are substantially identical and may comprise a wide variety of suitable components or other structures, such as, for example, a part of a vehicle (e.g., an aircraft, land vehicle, watercraft, space vehicle, etc.). The base plate 102 also comprises two base rails 104, on which a gantry 106 is slidably mounted. As shown in FIGS. 1A and 1B, the base rails 104 are substantially parallel to one another and are generally oriented along the X-axis. As a result, the base rails 104, which are sometimes referred to as X-rails, generally restrict the motion of the gantry 106 to movement along the X-axis.

The gantry 106, in turn, comprises two gantry clamps 124, which are configured to engage the base rails 104 to lock the gantry 106 in a substantially fixed position in the X-axis. The gantry 106 also includes two gantry rails 108 and two clamp rails 126, on which a cross slide 110 is slidably mounted. As shown in FIGS. 1A and 1B, the gantry rails 108 and clamp rails 126 are substantially parallel to one another and are generally oriented along the Y-axis, which is substantially perpendicular to the X-axis along which the base rails 104 are oriented. As a result, the gantry rails 108, which are sometimes referred to as Y-rails, and the clamp rails 126 generally restrict the motion of the cross slide 110 to movement along the Y-axis.

As shown in FIG. 1B, a transfer bar 128 is slidably mounted to the gantry 106 through two or more slots 130 with corresponding lockdown clamps 132. This configuration enables the transfer bar 128 to slide back and forth in the Y-axis until the lockdown clamps 132 are engaged, at which point the transfer bar 128 is locked in a substantially fixed position in the Y-axis. The transfer bar 128 also comprises two or more index bushings 134, which are separated by the same offset distance, d, by which the two workpieces 114 are separated. The index bushings 134 are securely fastened to the transfer bar 128. For example, in some cases, the index bushings 134 are pressed and bolted to the transfer bar 128.

The cross slide 110 comprises two cross slide clamps 136, which are configured to engage the clamp rails 126 to lock the cross slide 110 in a substantially fixed position in the Y-axis. The cross slide 110 also comprises an index pin 138 configured to releasably engage the index bushings 134. For example, in some cases, the index pin 138 has an outer diameter sized and shaped to fit snuggly within an inner diameter of the index bushings 134. This configuration enables the cross slide 110 to be moved easily from a first position to a second position in the Y-axis, separated by the selected offset distance, d. The cross slide further comprises a gimbal assembly 200, which is described in greater detail below in connection with FIGS. 2A-2C.

In the example shown in FIGS. 1A-1B, the first workpiece 114A has a plurality of holes 116, which are desired to be replicated on the second workpiece 114B, comprising a substantial duplicate of the first workpiece 114A. In some cases, for example, the first workpiece 114A may comprise an aircraft part in need of repair, and the second workpiece 114B may comprise a new, replacement part for the first workpiece 114A. In some cases, the workpieces 114 may be mounted on the X-Y transfer table 120 with an offset distance, d, of 8 inches or 12 inches in the Y-axis, and substantially zero offset in the X-axis. The hole transfer system 100 advantageously enables each hole 116 to be replicated on the second workpiece 114B with a high degree of precision, i.e., with a variation of no more than about 1/1000 inch from the X-Y-Z location and vector, or orientation, of the corresponding hole 116 on the first workpiece 114A.

In operation, the X-Y transfer table 120 may be used to position the gimbal assembly 200 correctly in both the X- and Y-axes to transfer a selected hole 116 from the first workpiece 114A to the second workpiece 114B. For example, an operator may slide the gantry 106 along the base rails 104 until the gantry 106 reaches the position of the selected hole 116 in the X-axis, and then slide the cross slide 110 along the gantry rails 108 until the cross slide 110 reaches the position of the selected hole 116 in the Y-axis. Once the gimbal assembly 200 is positioned at the desired X-Y coordinates, the operator can adjust the vertical position of the gimbal assembly 200, i.e., the position in the Z-axis, and also tilt and rotate the gimbal assembly 200 until it is aligned with the vector of the selected hole 116, i.e., aligned in the fourth and fifth axes.

Figure 2A:
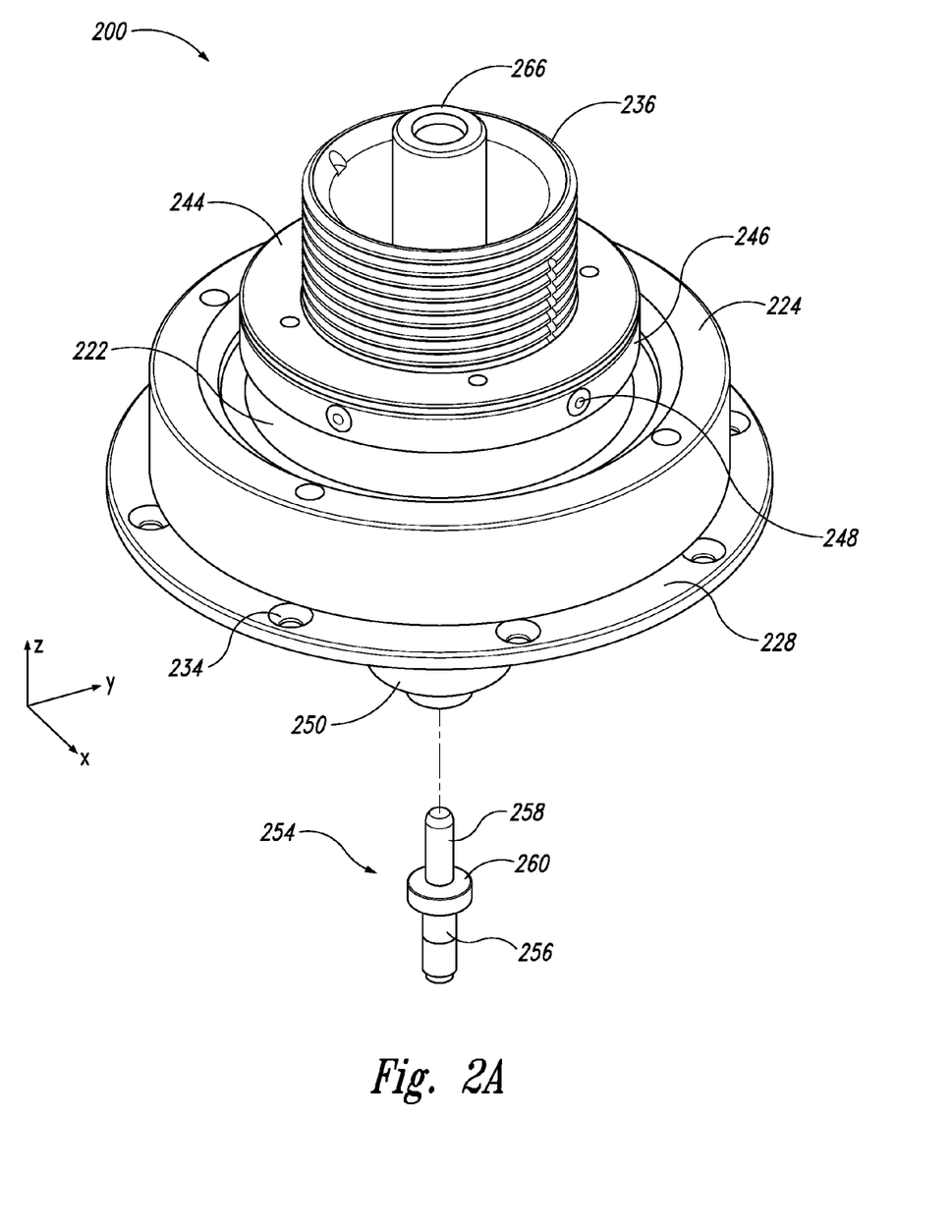
FIG. 2A illustrates a perspective view of one example of a gimbal assembly.
Figure 2B:
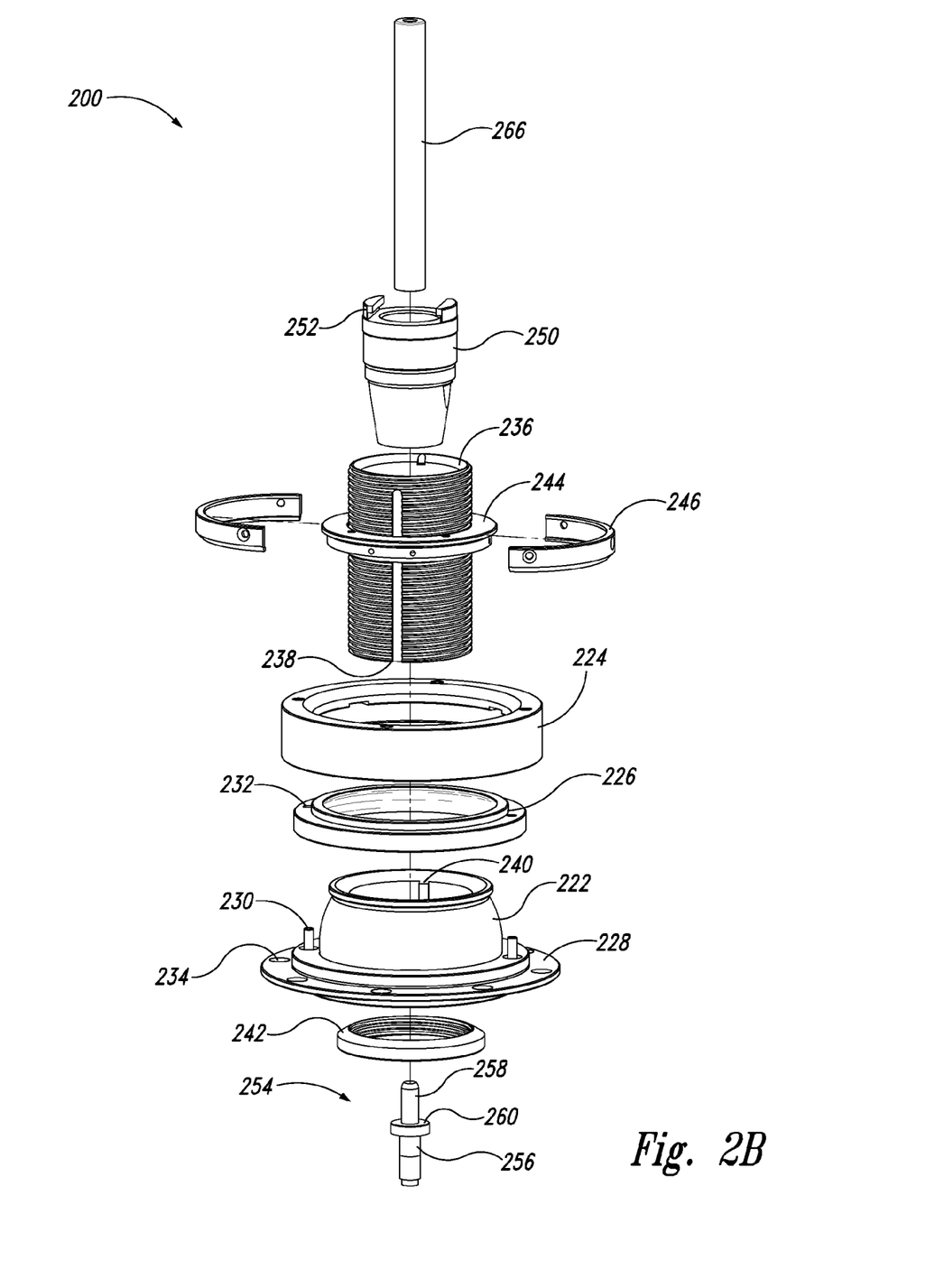
FIG. 2B illustrates an exploded view of the gimbal assembly shown in FIG. 2A.
Figure 2C:
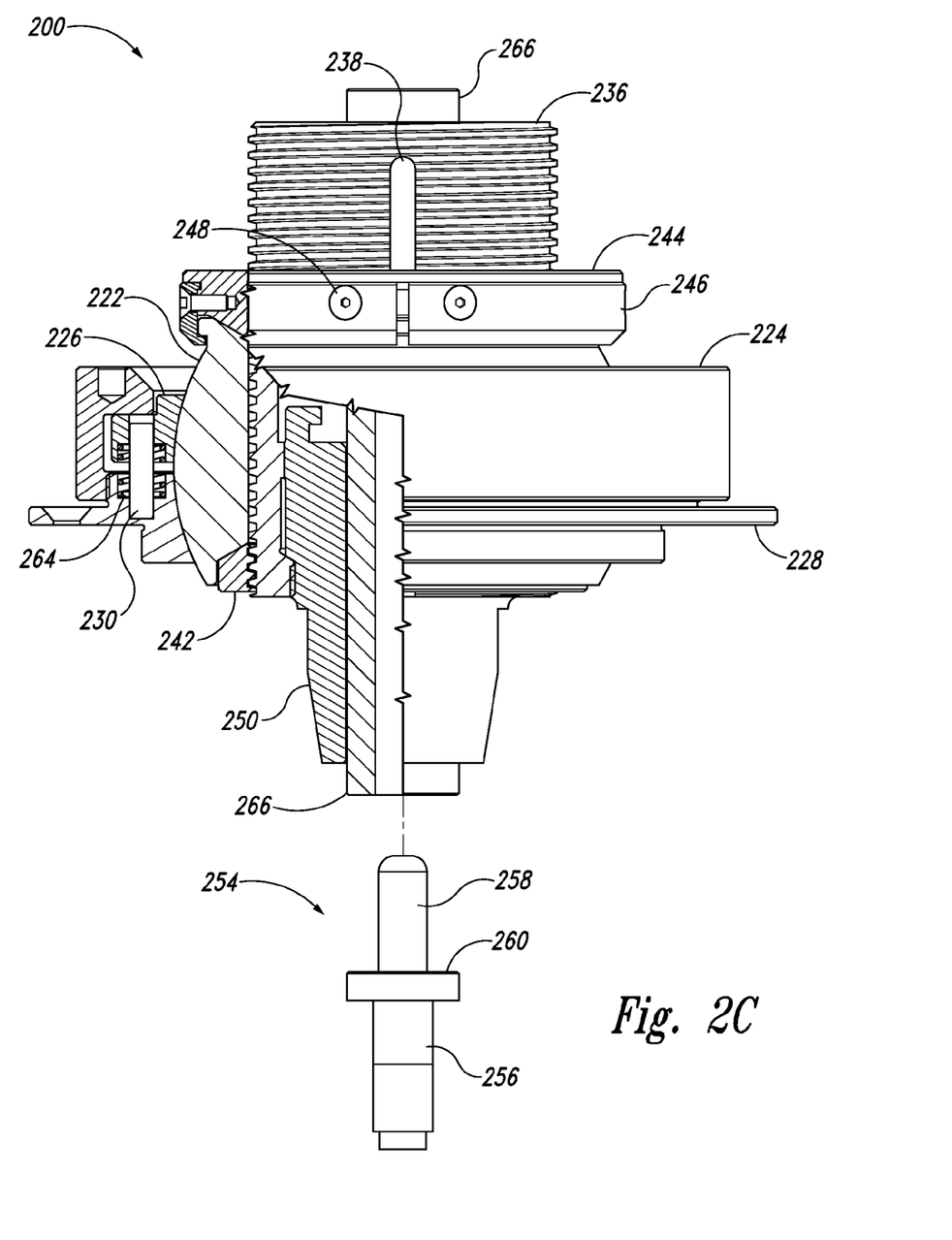
FIG. 2C illustrates a partial cross-sectional view of the gimbal assembly shown in FIG. 2A.
Figure 3:
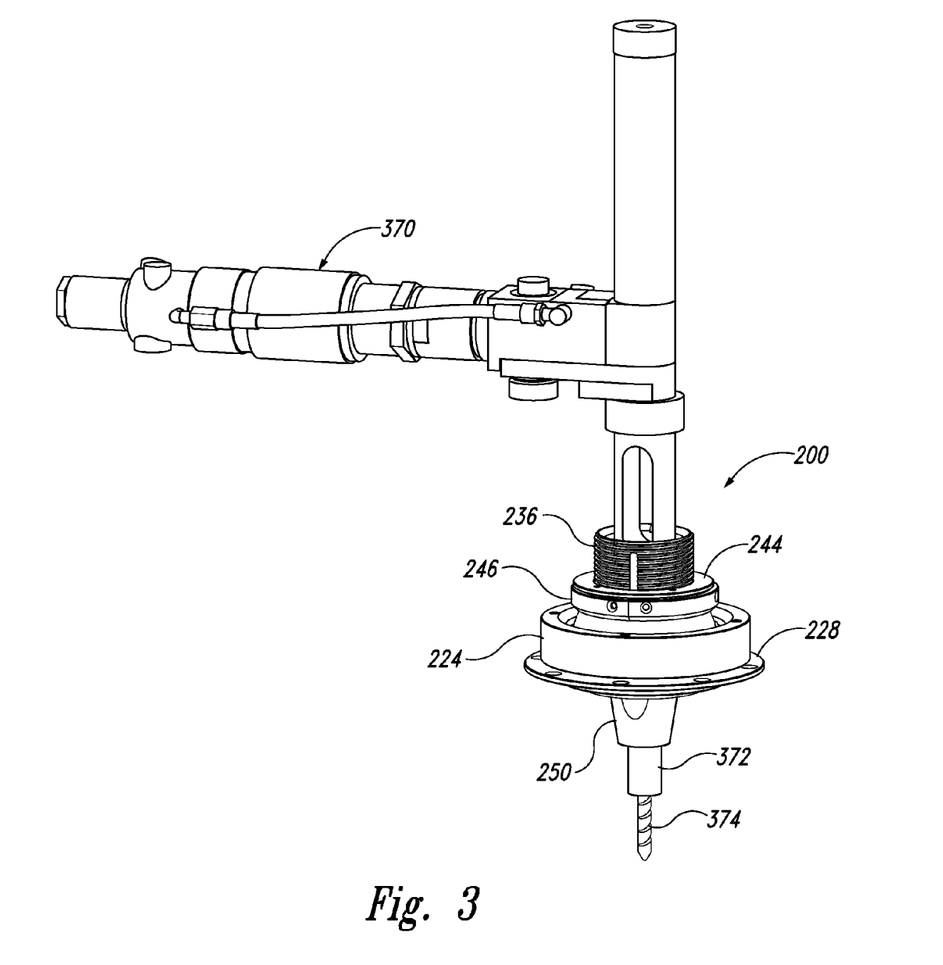
FIG. 3 illustrates the gimbal assembly of FIGS. 2A-2C coupled to a drill.

FIGS. 2A-2C illustrate a perspective view, exploded view, and partial cross-sectional view, respectively, of the gimbal assembly 200 shown in FIGS. 1A-1B. FIG. 3 illustrates the same gimbal assembly 200 coupled to a suitable drill 370. In the example illustrated in FIGS. 2-3, the gimbal assembly 200 comprises a gimbal 222 surrounded by a clamp nut 224, clamp ring 226, and flange ring 228. In some cases, the flange ring 228 may include a pair of posts 230 configured to mate with corresponding holes 232 in the clamp ring 226, to prevent the clamp ring 226 from rotating relative to the flange ring 228. As shown in FIG. 2C, the posts 230 may be surrounded by springs 264 to keep the clamp ring 226 separated from the flange ring 228 when the clamp nut 224 is loose, or in an unclamped configuration. In addition, the flange ring 228 may comprise a plurality of holes 234 through which the flange ring 228 may be coupled to the cross slide 110 (FIGS. 1A-1B) using suitable fasteners, such as, for example, screws, bolts, rivets, etc.

The clamp nut 224 may have a threaded interior surface configured to mate with a corresponding threaded exterior surface of the flange ring 228. In addition, the clamp ring 226 may have a spherical interior surface configured to mate with a complementary spherical exterior surface of the gimbal 222. Thus, when the clamp nut 224 is loose, the gimbal 222 floats smoothly within the clamp ring 226, i.e., rotates freely in any orientation, because the springs 264 bias the clamp ring 226 away from the flange ring 228 in this configuration. When the clamp nut 224 is tightened, however, the clamp ring 226 compresses against the flange ring 228, which locks the gimbal 222 in a substantially fixed orientation within the clamp ring 226.

The gimbal assembly 200 also comprises a threaded quill sleeve 236, configured to be mounted within the gimbal 222. In the particular example shown, the quill sleeve 236 comprises a pair of slots 238 keyed to corresponding tabs 240 located on an interior surface of the gimbal 222, to prevent the quill sleeve 236 from rotating within the gimbal 222. The gimbal assembly 200 further comprises a conical nut 242 and an adjustment nut 244, both having threaded interior surfaces configured to mate with the threaded exterior surface of the quill sleeve 236. The gimbal assembly 200 also comprises a retainer ring 246 configured to surround the quill sleeve 236 and the adjustment nut 244, which acts to keep the components of the gimbal assembly 200 in place. The retainer ring 246 may comprise two complementary pieces held in place by suitable fasteners 248, such as, for example, set screws, etc.

During use, an operator can adjust the vertical position (i.e., the position in the Z-axis) of the quill sleeve 236 within the gimbal 222, by rotating the adjustment nut 244 to the desired vertical position. The operator can then tighten the conical nut 242 until it reaches the bottom of the gimbal 222, thereby securing the quill sleeve 236 in the desired vertical position. The shape of conical nut 242 may advantageously be configured to mate with the bottom surface of the gimbal 222, which substantially reduces radial free play within the gimbal assembly 200 once the quill sleeve 236 is fixed in the desired vertical position.

In addition, the quill sleeve 236 is advantageously configured to receive and secure a suitable drill adaptor 250, or bushing guide, during operation. For example, in some cases, the quill sleeve 236 may have a threaded interior surface configured to mate with a threaded exterior surface of the drill adaptor 250. The drill adaptor 250, in turn, is preferably configured to receive and secure an alignment pin 266, as shown in FIGS. 2A-2C, as well as a drill bushing 372, as shown in FIG. 3.

The alignment pin 266 can be used during an alignment process to facilitate alignment of the gimbal assembly 200 with the vector of a selected hole 116 in the first workpiece 114A. During the alignment process, the operator may insert a suitable step pin 254 into the selected hole 116. The step pin 254 may comprise a lower portion 256 and an upper portion 258, separated by a shoulder 260. The step pin 254 may advantageously be selected such that the lower portion 256 has an outer diameter configured to fit snuggly within the inner diameter of the selected hole 116, while the shoulder 260 rests on the surface of the first workpiece 114A. In addition, the upper portion 258 of the step pin 254 may have an outer diameter selected to fit snuggly within the inner diameter of a corresponding alignment pin 266.

To capture the hole vector, the operator manipulates the gimbal 222, which floats within the clamp ring 226 as the alignment pin 266 interacts with the step pin 254. Once the alignment pin 266 is aligned with the step pin 254, the operator tightens the clamp nut 224, which locks the gimbal 222 in the selected orientation, thereby capturing the vector of the selected hole 116. The gimbal assembly 200 is configured such that, once the vector has been set, the gimbal 222 will remain locked in a substantially fixed position until the clamp nut 224 is loosened. As a result, the alignment pin 266 can then be removed from the step pin 254, and the gimbal assembly 200 can be positioned over the second workpiece 114B at the desired coordinates using the X-Y transfer table 120, in preparation for a drill process, described below.

During the drill process, the operator inserts and secures a drill bushing 372 of a suitable drill 370 into a corresponding drill adaptor 250 seated within the quill sleeve 236. The drill adaptor 250 may include one or more engagement mechanisms 252 (e.g., tabs, etc.), configured to securely fasten the drill bushing 372 to the drill adaptor 250. In the particular example shown in FIG. 3, the drill 370 comprises a Quackenbush® Series 230 drill marketed by Apex Tool Group, LLC located in Apex, N.C. Of course, numerous other suitable drills 370 could be utilized in addition to or in place of the particular drill 370 shown in FIG. 3. Many such drills 370 utilize a standard taper lock drill bushing 372, although the specific size and configuration of the drill bushing 372 may vary from one drill 370 to the next. Accordingly, the quill sleeve 236 is configured to accommodate various interchangeable drill adaptors 250, each of which is compatible with one or more drills 370, selected from a number of suitable drills 370. As a result, the gimbal assembly 200 does not need to be customized for each type of drill 370. Rather, the gimbal assembly 200 may be implemented with a single, universal design in which one drill adaptor 250 can be exchanged for another as needed to accommodate different drills 370.

Once the drill bushing 372 is secured within the drill adaptor 374, the desired new hole can be drilled in the second workpiece 114B using a suitable drill bit 374 that has an outer diameter sized to match the desired inner diameter of the new hole. Because the drill process follows the alignment process described above, the new hole is advantageously drilled at substantially the same X-Y-Z position and with substantially the same vector as the corresponding hole 116 in the first workpiece 114A. That is, the X-Y-Z location and vector of the new hole relative to the second workpiece 114B is substantially the same as the X-Y-Z location and vector of the original hole 116 relative to the first workpiece 114A.

Figure 4:
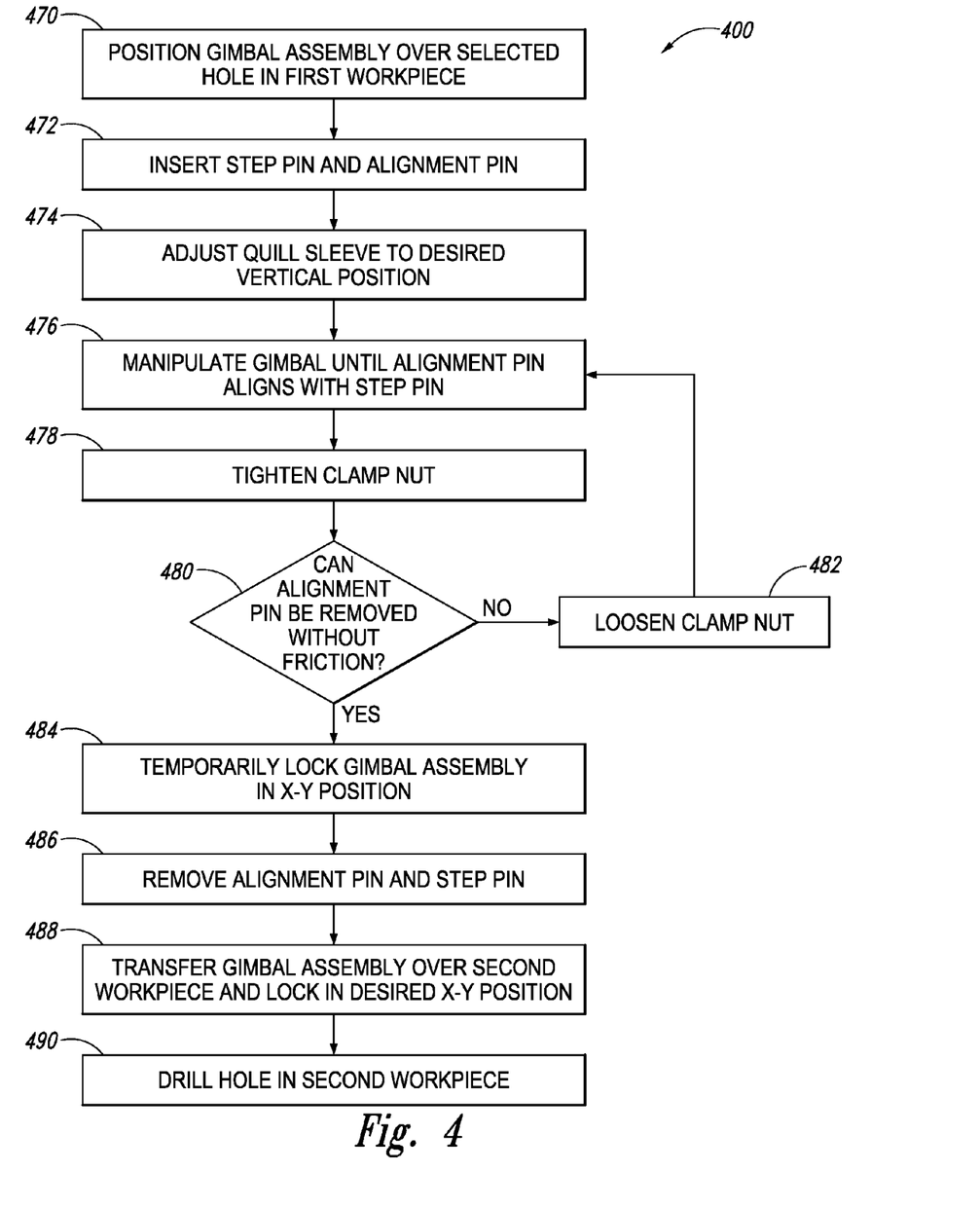
FIG. 4 illustrates a method for transferring a hole pattern from a first workpiece to a second workpiece.

FIG. 4 is a flow chart illustrating one example of a method 400 for transferring a selected hole 116 from a first workpiece 114A to a second workpiece 114B. In a step 470, the gimbal assembly 200 is positioned over the X-Y coordinates of the selected hole 116 in the first workpiece 114A. As described above, this step 470 may be carried out using the X-Y transfer table 120 by sliding the gantry 106 along the X-rails 104 and the cross slide 110 along the Y-rails 106 until the gimbal assembly 200 reaches the desired X-Y position. During this step 470, the index pin 138 of the cross slide 110 is engaged with the first index bushing 134A, corresponding to the first workpiece 114A, but the gantry clamps 124, lockdown clamps 132, and cross slide clamps 136 are loosened to allow the cross slide 110 and the transfer bar 128 to move as needed during the alignment process.

In a step 472, a step pin 254 is inserted into the selected hole 116, and a corresponding alignment pin 266 is inserted into the drill adaptor 250 of the gimbal assembly 200. In a step 474, the quill sleeve 236 of the gimbal assembly 200 is adjusted to the desired vertical position relative to the surface of the first workpiece 114A. In some cases, for example, the operator may telescope the quill sleeve 236 to a vertical position configured to place the drill bushing 372 above the surface of the second workpiece 114B at a distance within the range of about ½ to about 1 times the diameter of the drill bit 374. As described above, this step 474 can be carried out by rotating the adjustment nut 244 to the desired vertical position, and then tightening the conical nut 242 until it reaches the bottom surface of the gimbal 222.

In a step 476, the gimbal 222 is manipulated until the alignment pin 266 aligns with the step pin 254. In some cases, for example, the operator manipulates the gimbal 222 until the alignment pin 266 fits snuggly over the upper portion 258 of the step pin 254. As described above, the gimbal 222 can be rotated and tilted freely within the clamp ring 226 when the clamp nut 224 is loose, which enables the alignment pin 266 of the gimbal assembly 200 to mechanically determine the vector of the step pin 254. Then, in a step 478, the clamp nut 224 is tightened to lock the gimbal 222 in place in the desired orientation, thereby capturing the vector of the step pin 254 and, hence, the selected hole 116. In a step 480, the operator attempts to remove the alignment pin 266 from the step pin 254. If significant friction is detected, then in a step 482, the clamp nut 224 is loosened, and the operator repeats steps 476 and 478, until the alignment pin 266 can be removed from the step pin 254 without detecting significant friction. This condition indicates that the vector of the selected hole 116 has been determined accurately and captured mechanically.

Once that occurs, in a next step 484, the gantry clamps 124 are tightened to lock the gantry 106 in a substantially fixed position in the X-axis, and the lockdown clamps 132 are tightened to temporarily lock the transfer bar 128 and, hence, the cross slide 110 and gimbal assembly 200, in a substantially fixed position in the Y-axis. In a step 486, the alignment pin 266 is removed from the drill adaptor 250, and the step pin 254 is removed from the selected hole 116.

In a step 488, the gimbal assembly 200 is moved to the desired X-Y position over the second workpiece 114B and locked in place. As described above, this step 488 can be carried out by disengaging the index pin 138 from the first index bushing 134A, moving the cross slide in the Y-axis by the selected offset distance, d, and then engaging the index pin 138 with the second index bushing 134B, corresponding to the second workpiece 114B. As described above, the workpieces 114A, 114B are aligned on the X-Y transfer table 120 with the same offset distance, d, in the Y-axis and substantially zero offset in the X-axis. Accordingly, once the index pin 138 is engaged with the second index bushing 134B, the gimbal assembly 200 is positioned at the desired X-Y location over the second workpiece 114B. The gantry clamps 124 can then be tightened to further secure the cross slide 110 and, hence the gimbal assembly 200, in a substantially fixed position in the Y-axis.

In a final step 490, a new hole is drilled in the second workpiece 114B, using a suitable drill 370. As described above, this final step 490 can be carried out by engaging an appropriate drill bushing 372 with a corresponding drill adaptor 250 and then drilling the new hole with an appropriate drill bit 374. By following the steps described above, the new hole is advantageously drilled at substantially the same X-Y-Z position and with substantially the same vector in the second workpiece 114B as the corresponding hole 116 in the first workpiece 114A. For example, in some cases, the method 400 duplicates the selected hole 116 in the second workpiece 114B with a variation of no more than about 1/1000 inch from the X-Y-Z location and vector of the corresponding hole 116 in the first workpiece 114A. The method 400 can be repeated for each hole 116 in the first workpiece 114A, until the entire hole pattern of the first workpiece 114A has been duplicated in the second workpiece 114B.

The hole transfer system and method described above present a number of distinct advantages over conventional hole transfer approaches. For example, the hole transfer system 100 enables a hole pattern to be duplicated mechanically from an existing part to a new part, without requiring a CNC machine, jig bore, computer or other electronics. The system 100 includes a gimbal assembly 200 that mechanically captures the X-Y-Z position and orientations (i.e., 5 axes) of each hole in an existing hole pattern. As a result, the hole transfer system 100 can advantageously be powered by a generator in settings in which a reliable power source is not available (e.g., remote locations, undeveloped regions, etc.). The hole transfer system 100 is also much more economical than traditional solutions requiring CNC machines.

In addition, the hole transfer system 100 is highly accurate, in part because the gimbal assembly 200 includes a quill sleeve 236 that can telescope in the Z-direction, as described above. By enabling the operator to adjust the vertical position of the quill sleeve 236, the drill can advantageously be positioned near the second workpiece 114B, which substantially reduces drill "walking" and increases the overall precision of the hole transfer system 100.

Figure 5:
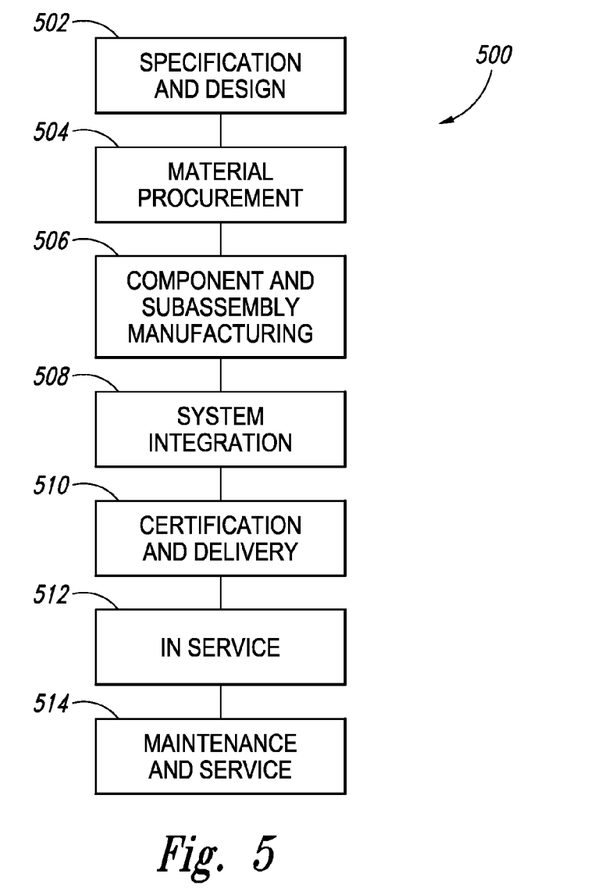
FIG. 5 illustrates a flow diagram of an aircraft production and service methodology.
Figure 6:
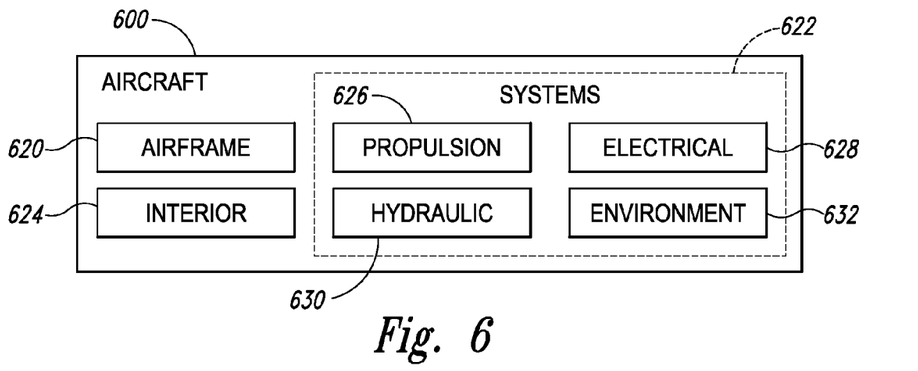
FIG. 6 illustrates a block diagram of an aircraft.

Referring to FIGS. 5-6, the systems and methods of the present application may be implemented in the context of an aircraft manufacturing and service method 500 as shown in FIG. 5 and an aircraft 600 as shown in FIG. 6. During pre-production, exemplary method 500 may include specification and design 502 of the aircraft 600 and material procurement 504. During production, component and subassembly manufacturing 506 and system integration 508 of the aircraft 600 takes place. Thereafter, the aircraft 600 may go through certification and delivery 510 in order to be placed in service 512. While in service 512 by a customer, the aircraft 600 is scheduled for routine maintenance and service 514 (which may also include modification, reconfiguration, refurbishment, and so on).

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 6, the aircraft 600 produced by exemplary method 500 may include an airframe 620 with a plurality of systems 622 and an interior 624. Examples of high-level systems 622 include one or more of a propulsion system 626, an electrical system 628, a hydraulic system 626, and an environmental system 628. Any number of other systems may be included. Although an aerospace example is shown, the principles of the disclosed embodiments may be applied to other industries, such as the automotive industry.

Apparatus and methods embodied herein may be employed during any one or more of the stages of the production and service method 500. For example, components or subassemblies corresponding to production process 506 may be fabricated or manufactured in a manner similar to components or subassemblies produced while the aircraft 600 is in service 512. Also, one or more apparatus embodiments, method embodiments, or a combination thereof may be utilized during the production stages 506 and 508, for example, by substantially expediting assembly of or reducing the cost of an aircraft 600. Similarly, one or more of apparatus embodiments, method embodiments, or a combination thereof may be utilized while the aircraft 600 is in service 512, for example and without limitation, to maintenance and service 514.

Although this disclosure has been described in terms of certain preferred configurations, other configurations that are apparent to those of ordinary skill in the art, including configurations that do not provide all of the features and advantages set forth herein, are also within the scope of this disclosure. Accordingly, the scope of the present disclosure is defined only by reference to the appended claims and equivalents thereof.

What is claimed is:

1. A system for transferring one or more holes from a first workpiece to a second workpiece that is a substantial duplicate of the first workpiece, the system comprising:
    a gimbal assembly configured to mechanically determine a first position of a first hole in the first workpiece, wherein the first position comprises a first set of X, Y and Z coordinates relative to a surface of the first workpiece,
    wherein the gimbal assembly is further configured to mechanically determine a first vector of the first hole within the first workpiece, and
    wherein the gimbal assembly is further configured to secure a drill at substantially the same vector as the first vector of the first hole while a second hole is drilled at a second position in the second workpiece, wherein the second position relative to the second workpiece is substantially the same as the first position relative to the first workpiece;
    wherein the gimbal assembly comprises a floating gimbal surrounded by a locking nut that releasably fixes the position of the floating gimbal.

2. The system of claim 1, wherein the gimbal assembly comprises an alignment component configured to telescope in the Z-axis.

3. The system of claim 2, wherein the alignment component comprises a quill sleeve.

4. The system of claim 2, wherein the alignment component is configured to receive and secure a plurality of interchangeable drill adaptors, wherein each drill adaptor corresponds to a different drill.

5. A system comprising:
    a gimbal surrounded by a clamp ring and a clamp nut, wherein the gimbal is configured to rotate freely within the clamp ring when the clamp nut is loose and to remain locked in a substantially fixed position within the clamp ring when the clamp nut is tightened; and
    a quill sleeve housed within the gimbal,
    wherein the quill sleeve is configured to adjust to a desired vertical position relative to the gimbal and is further configured to receive and secure a drill adaptor, and an adjustment nut and a conical nut coupled to the quill sleeve and configured to adjust the quill sleeve to a desired vertical position relative to the gimbal.

6. The system of claim 5, further comprising:
    a gantry slidably mounted to an X-Y transfer table; and
    a cross slide assembly slidably mounted to the gantry, wherein the gimbal is housed within a gimbal assembly coupled to the cross slide assembly.

7. The system of claim 6, further comprising:
    a base module coupled to the X-Y transfer table,
    wherein the base module is configured to receive and secure a first workpiece at a selected first position in an X-axis, Y-axis, and Z-axis, the first workpiece having a plurality of holes arranged in a first hole pattern, and
    wherein the base module is further configured to receive and secure a second workpiece substantially identical to the first workpiece in which the first hole pattern is desired to be replicated, the second workpiece being secured at a selected second position such that the second workpiece is substantially parallel to the first workpiece in the Y-axis at a selected offset distance, d, and is substantially aligned with the first workpiece with substantially zero offset in the X-axis and the Z-axis.

8. The system of claim 6, further comprising a transfer bar slidably mounted to the gantry, wherein the transfer bar includes two or more index bushings separated by a selected offset distance, d, and configured to engage with an index pin coupled to the cross slide assembly.

9. A method for duplicating a hole from a first workpiece to a second workpiece substantially identical to the first workpiece, the method comprising:
    positioning a gimbal assembly over a first hole at a first location relative to the first workpiece;
    inserting a step pin into the first hole;
    inserting an alignment pin into the gimbal assembly;
    mechanically aligning the alignment pin with the step pin to determine a first vector of the first hole;
    securing the gimbal assembly in alignment with the first vector;
    removing the alignment pin from the gimbal assembly;
    removing the step pin from the first hole;
    moving the gimbal assembly to a second location over the second workpiece, wherein the second location relative to the second workpiece is substantially the same as the first location relative to the first workpiece;
    drilling a second hole in the second workpiece at the second location and at a second vector that is substantially the same as the first vector.

10. The method of claim 9, wherein positioning the gimbal assembly over the first hole comprises sliding a gantry along one or more base rails and sliding a cross slide along one or more gantry rails.

11. The method of claim 9, wherein mechanically aligning the gimbal assembly comprises rotating and tilting a floating gimbal within a clamp ring.

12. The method of claim 9, wherein securing the gimbal assembly comprises tightening a clamp nut.

13. The method of claim 9, further comprising adjusting an alignment component to a desired vertical position within the gimbal assembly.

14. The method of claim 13, wherein adjusting the alignment component comprises rotating an adjustment nut to a desired vertical position, and then tightening a conical nut until it reaches a bottom surface of a gimbal.

15. The method of claim 9, further comprising temporarily securing the gimbal assembly over the first hole location after the gimbal assembly is secured in alignment with the first vector.

16. The method of claim 15, wherein temporarily securing the gimbal assembly comprises engaging a lockdown clamp with a transfer bar slidably mounted to a gantry in which the gimbal assembly is housed.

17. The method of claim 9, wherein moving the gimbal assembly to the second location over the second workpiece comprises:
    disengaging an index pin from a first index bushing;
    moving the cross slide by a selected offset distance, d; and
    engaging the index pin with a second index bushing.

18. The method of claim 9, wherein the first hole is duplicated in the second workpiece with a variation of no more than about 1/1000 inch from the location and vector of the first hole in the first workpiece.

* * * * *